United States Patent [19]

Koch

[11] 4,395,232
[45] Jul. 26, 1983

[54] OVEN CONTROL APPARATUS
[75] Inventor: Albert P. Koch, Kinnelon, N.J.
[73] Assignee: Nabisco Brands, Inc., Parsippany, N.J.
[21] Appl. No.: 327,846
[22] Filed: Dec. 7, 1981
[51] Int. Cl.³ .................... F27D 21/00; F27D 19/00
[52] U.S. Cl. ................... 432/32; 73/861.49; 73/861.51; 73/861.66; 73/861.67; 432/37; 432/55
[58] Field of Search ............. 432/32, 37, 55; 73/861.49, 861.51, 861.66, 861.67

[56] References Cited

U.S. PATENT DOCUMENTS

| | | | |
|---|---|---|---|
| 1,056,513 | 3/1913 | Dodge | 73/861.49 |
| 1,229,805 | 6/1917 | Stevenson | 73/861.51 |
| 1,615,217 | 1/1927 | Dressler | 432/32 |
| 1,645,449 | 10/1927 | Proebstel | 73/861.66 |
| 3,209,145 | 9/1965 | McGrath | 73/861.49 |

Primary Examiner—John J. Camby
Attorney, Agent, or Firm—Richard Kornutik

[57] ABSTRACT

Disclosed is an apparatus useful in controlling the operation of ovens of the type typically associated with baking food products. Broadly, the apparatus permits the linear display of heat input to one or more zones of an oven responsive to gas flow. Heat input is indicated by fluid levels in manometers having their legs dimensioned to permit linear display of heat input despite the variance of gas flow with the square of the pressure. The manometers are positioned next to an adjustable scale which accommodates combustible gases of varying heat contents. The adjustable scale is preferably marked for the preferred heat input profile across the various zones of the oven to facilitate control of optimum heat input to the oven as a whole. Also disclosed are similar display devices for exhaust gases.

18 Claims, 3 Drawing Figures

OVEN CONTROL APPARATUS

BACKGROUND OF THE INVENTION

The present invention relates to ovens; and, more particularly, to apparatus for monitoring and controlling the operation of ovens heated by combustible gases.

Increasing the efficiency of combustible gas-heated ovens is becoming increasingly, economically and ecologically important. The heating requirements for a given oven to properly process a material is largely dictated by the nature of the product and the construction of the oven. Typically, for baking a product based upon a flour-water system, such as crackers or cookies, about 40 to 50% of all heat generated by the combustion gases is required to remove water. Additional heat is required to simply heat the combustion gases, including an excess of about 25% air required for complete combustion, to the temperature of stack discharge. Additional heat is lost with removal of the product and to the surroundings by the processing equipment.

The heating value of the combustion gases is used inefficiently where either too great or too little an amount of heat is supplied. This is true for the oven as a whole and for each individual zone thereof. For example, in the exemplary situation of baking cookies or crackers, supplying heat at too great a rate can actually decrease the effectiveness of the baking operation by causing the product to skin and seal the moisture in the product. Where the amount of heat supplied to the process is less than that required at a particular zone, insufficient heat will be available to drive off water at the optimum rate, and disproportionate amounts of the heat will be lost to factors other than removal of water from the product. And, required adjustments to other zones to correct for the deficiency will result in further inefficiencies.

Automatic temperature control within an oven is advantageous for achieving optimum product quality, but by itself cannot provide oven efficiency. Temperature control does not account for the rate of air input to the oven, the rate of exhaust, the humidity conditions within the oven, the effectiveness of combustion at a particular burner, and the presence of unlit burners, which all play significant roles in proper oven operation. Automatic temperature control was also found to be unsatisfactory due to inter-zone flow which resulted in false indications of temperature in adjacent zones. The result was that steady state conditions could rarely be obtained because the automatic controllers were continuously hunting, making conditions worse than manual pressure control.

Control of the pressure of the incoming combustible gas, in combination with control of the operating temperature, is also often misleading because it does not take into account enough of the significant factors and permits the inefficient use of heat to render the other factors unimportant from the standpoint of product quality. For example, pressure control alone does not inform the oven operator of the existence of burner failure. The unlit burner continues to draw gas which is not utilized for its heating value. The resulting reduced temperature then creates the demand for greater gas flow to that zone as well as adjacent zones with a resulting alteration of temperatures not only in the zone having the unlit burner, but in adjacent zones. Attempting to control oven heat input by controlling the pressure often leads to having the whole oven out of balance since the tendency exists to change adjacent zones to make up the temperature within a target zone.

SUMMARY OF THE INVENTION

It is an object of the present invention to provide an improved apparatus for displaying the rate of heat input into a single zone of an oven to facilitate control.

It is a further and more specific object of the present invention to provide an apparatus for displaying the rate of heat input into a plurality of zones of an oven to facilitate control and achievement of an optimum heat input profile for the oven.

It is yet a further and more specific object of the present invention to provide an apparatus for controlling both the heat input and the rate of exhaust gas removal across a plurality of zones of an oven to facilitate control of the oven at the optimum profiles for both heat input and exhaust.

These and other objects are achieved according to at least preferred embodiments of the invention, which provide an apparatus for displaying the rate of heat input to a zone of an oven; an apparatus for controlling the heat input and distribution of heat within an oven having a plurality of zones; and an apparatus for controlling the heat input and distribution of heat, and the rate of removal of exhaust gases from an oven having a plurality of zones.

In its broad aspects, the present invention provides an apparatus for displaying the rate of heat input to a zone of an oven of the type comprising burner means, gas supply means comprising a supply conduit for transporting combustible gas between a pressurized source and the burner means, and valve means operable to vary the flow of combustible gas through the supply conduit, wherein the apparatus comprises: (a) a manometer in communication with the supply conduit, having two upwardly-directed legs and containing sufficient fluid to at least partially fill each leg throughout the intended operating range, wherein one of said legs is a display leg, and the cross-sectional areas of both legs are proportioned effectively to cause the level of fluid in the display leg to move in direct relation to the rate of flow of combustible gas to the burner means; (b) an adjustable scale juxtaposed with the display leg and linearly calibrated to indicate the rate of heat input to the zone of the oven for a given rate of flow of combustible gas indicated by the level of fluid in the display leg; and (c) means for adjusting said adjustable scale to correct for the heating value of the combustible gas.

According to a preferred and more specific embodiment of the invention, several display apparatus of the type described above are employed together to facilitate monitoring and control of the heat input and distribution of heat within an oven having a plurality of zones, each zone comprising separate burner means, separate gas supply means, and valve means operable to vary the flow of combustible gas through the supply conduit. In a preferred aspect of this embodiment, the adjustable scale is marked to indicate the preferred heat input profile for the plurality of zones of the oven, whereby the gas flow to each zone can be controlled by operating the valve means for each zone to adjust the fluid level in the associated display leg to the preferred heat input indicated for each zone.

According to another preferred embodiment of the invention, the apparatus of the type described above further comprises exhaust display means for displaying the rate of removal of exhaust gases from the individual zones of the oven, each zone comprising separate exhaust duct means and damper means operable to vary the flow of exhaust gases through the exhaust duct means, wherein the exhaust display means comprises: (a) for each zone of the oven, an exhaust manometer in communication with the exhaust duct means, the exhaust manometer comprising two upwardly-directed legs and containing sufficient fluid to at least partially fill each leg throughout the intended operating range, wherein one of said legs is an exhaust display leg wherein the level of fluid will move in response to the rate of flow of exhaust gases through the exhaust duct means; (b) means for positioning the exhaust display legs for each zone of the oven in the same sequence that the associated exhaust duct means occupy within the oven; and (c) a chart positioned adjacent to the exhaust display legs, the chart being calibrated to indicate the rate of exhaust for each zone and marked to indicate the preferred exhaust profile for the plurality of zones of the oven, whereby the exhaust flow from each zone can be controlled by operating the damper means associated therewith to adjust the fluid level in the associated exhaust display leg to the preferred value for each zone.

BRIEF DESCRIPTION OF THE DRAWINGS

The invention will be better understood and its advantages will become more apparent from the following detailed description, especially when read in light of the attached drawings wherein.

DETAILED DESCRIPTION OF THE INVENTION

To control oven heat efficiently, one should determine the optimum rate of removal of water from the product. This will indicate the relative quantity of heat required at indicated points in the processing and the relative rate of exhaust at those points. Other items such as starting material or product moistures, oven surface losses, and total residence time within the oven are relatively fixed and there is little that can be done about them. Therefore, if the operator controls the heat input and exhaust according to a pre-determined optimum pattern, the humidity and temperature will also be controlled for a given set of operating conditions.

If heat input and exhaust flow are controlled, temperature can be used as a backup method to spot unlit burners, thereby providing an extra degree of safety and permitting the operator the opportunity to conserve combustible gas by shutting off the unlit burner and appropriately adjusting the supply of combustible gas to the affected zone within the oven to achieve the optimum heat input to the zone.

Figure 1:
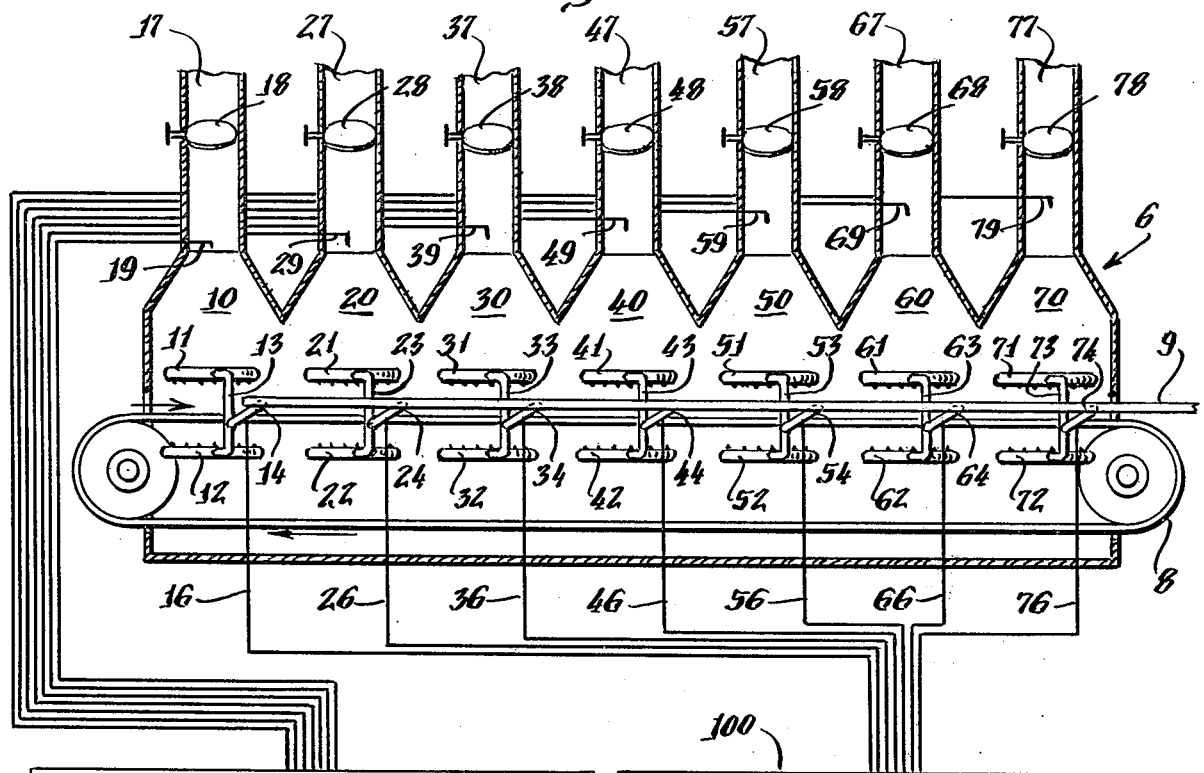
FIG. 1 is a schematic representation, partly in section, of an oven having seven zones with separate burner units and exhaust means for each, and for which heat input and exhaust rate display devices according to the present invention are provided.

Referring now to FIG. 1, there is seen an oven schematically represented in partial section as 6. It will be understood that the representation of the oven in the drawing is not to scale, but is for illustration purposes only. It is to be understood, however, that the term "oven" as used herein refers to heating devices of the type described regardless of the type of heating effected, thus, ovens according to the invention can be employed for roasting, drying, curing, tempering, annealing, and other heating processes. While the apparatus of the present invention can be employed to facilitate the control of ovens for any purpose, such as drying tunnels, the following discussion will focus on the operation of a baking oven, such as the kind employed in the baking of cookies and crackers for illustrative purposes. The oven is shown to have a continuously moving belt 8 which carries products to be heated into the oven at the left side of the drawing and carries them through seven independent zones of the oven and discharges them, fully baked at the right hand side of the drawing.

The continuous belt 8 within oven 6 can be of any suitable material and construction. Typically, it will be a metal band or an open mesh belt which permit heating of the product from both top and bottom. The oven 6 is shown to have seven independent zones, 10, 20, 30, 40, 50, 60 and 70, each of which has independent burner means, gas supply means comprising a supply conduit for transporting combustible gas between a pressurized source and the burner means, valve means operable to vary the flow of combustible gas through the supply conduit, exhaust duct means, and damper means operable to vary the flow of exhaust gases through the exhaust duct means.

The arrangement and function of the various independent means for each zone of the oven 6 will be described with specific reference to zone 10 of FIG. 1. Like parts in other zones, having similar functions to those described for zone 10 will be identified in FIG. 1 by two-digit numbers, the first digit indicating the zone and the second digit corresponding to the digit for the like part in zone 10. For example, in zone 10, there is shown an independent burner means comprising an upper burner unit 11, a lower burner unit 12 and a zone supply header 13 for supplying combustible gas to both of burners 11 and 12; and the like parts in zone 20 will be 21 for the upper burner unit, 22 for the lower burner unit, and 23 for the zone supply header supplying combustible gas to both burner units 21 and 22. The upper burner 11 and the lower burner 12 within zone 10 are independently lightable burners. In the event that one of these burners does not light, the flow of gas to it is preferably cut off by valve means not shown. It will be understood that any desired number of independent burner units within a zone can be employed, all fed with combustible gas by means of zone supply header 13.

Combustible gas is supplied to the various zone supply headers, 13 through 73, for the individual zones by means of a primary supply conduit 9 which transports the combustible gas between a pressurized source (not shown) and the individual zone headers via supply conduits 14, 24, 34, 44, 54, 64, and 74. The term "combustible gas" as used herein refers to any gas which can take part in combustion to produce heat. In some cases, a fuel gas such as propane, natural gas or methane, will be the combustible gas flowing through headers 13 through 73. In these cases, the air required for combustion can be drawn into the burner units by venturi effect or otherwise supplied as known to the art. In other cases, the combustible gas in headers 13 through 73 will be air. The flow is then measured for the air into which is drawn a fuel gas by venturi or other means known to the art. Within each one of the individual supply conduits, there is positioned a valve means of conventional construction (not shown) operable to vary the flow of combustible gas through the individual supply conduit. The valve is controlled by means of gas pressure controls 15, 25, 35, 45, 55, 65 and 75 on control panel 100, the controlling action being transmitted to the individual valve means via control lines 16, 26, 36, 46, 56, 66 and 76. Thus, by rotating the appropriate zone gas pressure control on the control panel 100, the supply of gas to the appropriate zone is achieved. This, however, is the type of control previously employed when only the pressure of the gas to the zone was controlled, and does not directly indicate either the flow rate of the gas to the zone or the total heating value of the gas supplied. As will be described later with regard to the description of control panel 100 and the apparatus shown in FIG. 2, the present invention now enables the direct reading and variation of the heat input into each of the zones independently to permit control of the heat distribution within the oven to a profile determined to be optimum for a particular product.

Figure 3:
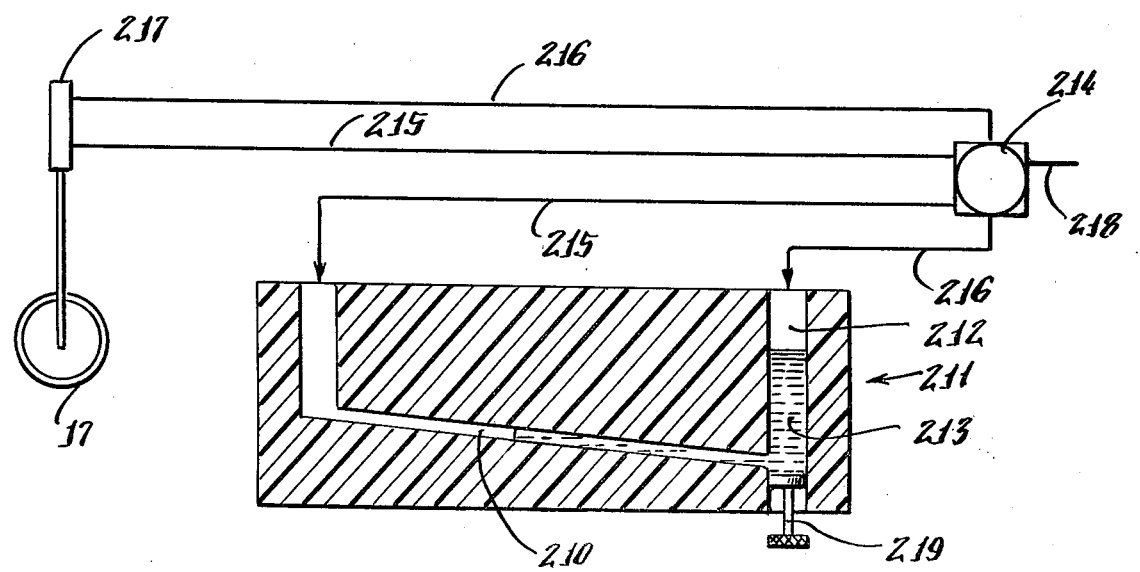
FIG. 3 schematically shows, partly in section, an exhaust rate display unit for a single zone according to the present invention.

Again referring to FIG. 1, the oven is shown to comprise separate exhaust duct means 17, 27, 37, 47, 57, 67 and 77 for each of the zones within the oven. Associated with each of these exhaust duct means are damper means 18, 28, 38, 48, 58, 68 and 78, respectively, operable to vary the flow of exhaust gases through the respective duct means. These damper means can be operated manually at their location or can be controlled remotely via controls on the panel 200 or the like. The rate of flow of exhaust gases through the individual exhaust duct means is sensed by means shown in detail in FIG. 3 and transmitted to display panel 200 via lines 19, 29, 39, 49, 59, 69 and 79. Note that for ease of illustration, both the high pressure and low pressure lines which will be described later in reference to FIG. 3 are shown as single lines 19 through 79. The present invention enables the measurement of the rate of removal of exhaust gases from the individual zones of the oven to facilitate optimization of the performance of each particular zone and the overall performance of the oven by exhausting the amount of gases determined to be optimum for the individual zones.

Referring now to control panel 100 in FIG. 1, there are seen a number of display legs, 110, 120, 130, 140, 150, 160 and 170, each of which contains fluid indicating the rate of heat input to its respective zone. In the description of the control panel 100 and the associated apparatus shown schematically in FIG. 2, the three-digit numerals will indicate by the first digit, 1, that it is the heat input control apparatus which is being referred to; by the second digit, the associated zone; and by the third digit its relation to like parts for the displays for the various zones.

The various display legs for the associated zones are shown on control panel 100 to be juxtaposed with an adjustable scale 101 which is linearly calibrated to indicate the rate of heat input to the zone of the oven for a given rate of flow of combustible gas indicated by the level of fluid in the display leg. In one particular embodiment, the display legs are channels of substantially uniform cross-sectional diameter within a transparent material and are placed directly over the adjustable scale which is calibrated to show one therm of energy input per inch of scale. Because the heating value of combustible gases will vary, depending upon their composition, the scale 101 will be adjustable to compensate for this variation.

According to a preferred embodiment, as shown in FIG. 1, a calibration scale 102 is provided adjacent the adjustable scale, and the adjustable scale is marked with a set point 103. The calibration scale has markings indicating a range of heating values for various combustible gases. By aligning the set point indicator 103 with an appropriate marking on the calibration scale 102 corresponding to the heating value of the combustible gas in use, the scale can be properly adjusted to directly read heat input based on pressure measurements taken in the individual supply conduits associated with the independent zones of the oven.

Figure 2:
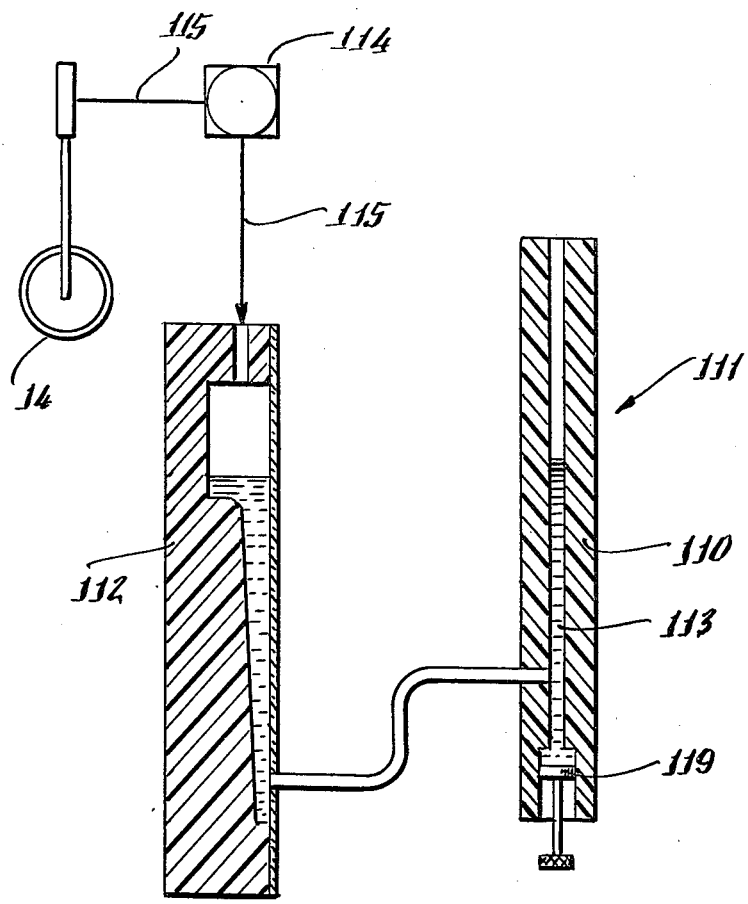
FIG. 2 schematically shows, partly in section, one embodiment of a heat input display unit according to the present invention.

Reference is now made to FIG. 2 which shows a schematic representation of a device according to the present invention enabling direct readout of heat input by measuring the pressure of gas flowing to the individual zones of the oven. FIG. 2 shows a manometer 111 in communication with supply conduit 14. The manometer 111 has two upwardly-directed legs 110 and 112 and contains sufficient fluid 113 to at least partially fill each leg throughout the intended range of operating pressures. The cross-sectional areas of legs 110 and 112 are proportioned effectively to cause the level of fluid in the display leg to move in direct proportion to the rate of flow of combustible gas to the burner means. This variation in cross-sectional diameter is required because the rate of flow of gas is directly proportional to the square of the applied pressure. Therefore, unless the variation is made, the height of fluid in the display leg will not vary in direct relation to changes in gas pressure supplied to a particular zone.

According to the embodiment shown in FIG. 2, the channel holding the fluid 113 within display leg 110 is of substantially uniform cross-section whereas the cross-sectional area of the channel within the other leg is tapered, the cross-sectional area increasing proportionally to height, with the upper-most cross-section being the largest. Given the desired scale calibration and range of fluid column movements, the degree of taper can effectively be calculated to provide the desired linear movement of fluid within the display leg for associated increases and pressure, based on the rule that the quantity of heat input, and therefore movement of fluid within the display leg varies with the square of the applied pressure. Conveniently, the calculations can be directly translated from a digital computer to a digitally controlled milling machine and the channels milled to the precise taper.

With further reference to control panel 100 in FIG. 1, there are shown vent valves 114, 124, 134, 144, 154, 164 and 174. These vent valves are associated with the manometers, the vent valves having an operative position to interrupt the communication with the supply conduit and open the manometer display legs to the atmosphere, and means for adjusting the level of fluid in the display leg while the vent valve is in the operative position. In the event that one or more of the burners within a particular zone fails to light, it is preferred to cut off the flow of gas to that particular burner and increase the level of gas input to the other burners in the zone. By calibrating the particular oven in use, it will be found that the desired level of heat input to a zone having one or more burners out of operation can be achieved by increasing the pressure to pre-determined levels. However, because the adjustable scale is calibrated to read heat input based upon sensed pressures, the indicated heat input would be too high at the required pressures where one or more burners were out. Thus, the vent valves 114 through 174 are provided to adjust the zero point for the fluid column height according to a predetermined scale which takes into account the fact that increased pressures are required to supply a given amount of heat.

Referring to FIG. 2, valve 114 has an operative position for venting wherein the pressure line 115 is removed from the normal communication with the manometer. This re-establishes uniform ambient pressure on both legs of the manometer and permits zero point adjustment of the fluid level in the display leg 110 by means of a well and set screw device 119 shown in FIG. 2.

According to a preferred arrangement according to the invention, a plurality of manometers such as shown in FIG. 2 are aligned in a control panel such as 100 in the sequence in which their associated zones within the oven are aligned. The adjustable scale will preferably be marked to indicate the preferred heat input profile for the plurality of zones of the oven, whereby the flow of combustible gas from each of the zones can be controlled by operating the valve means for each zone to adjust the fluid level in the associated display leg to the preferred heat input indicated for each zone. The line indicated as 104 on the control panel 100 in FIG. 1 is representative of such a heat input profile. By employing a control panel with an associated heat input profile in this manner, an oven operator can at a glance tell whether the preferred heat input to any particular zone needs adjustment.

In addition to control of the heat input, efficient operation of an oven is further facilitated by an ability to determine and adjust the rate of exhaust from each of the zones of the oven. As with the quantity of heat input to a particular zone, which can be displayed linearly through the use of manometers according to the present invention, the rate of removal of exhaust gases can also be monitored on a scale responsive to pressure readings. Display panel 200 in FIG. 1 illustrates an exhaust display means for displaying the rate of removal of exhaust gases from the individual zones of an oven of the type described wherein each zone comprises a separate exhaust duct means and damper means operable to vary the flow of exhaust gases through the exhaust duct means. FIG. 1 shows panel 200 in a top plan view for ease of illustration. The exhaust display means 200 as shown in FIG. 1 comprises, for each zone of the oven, an exhaust manometer. The display legs of the manometers are shown in FIG. 1 as 210, 220, 230, 240, 250, 260 and 270.

FIG. 3 schematically illustrates the operation of the exhaust manometers in more detail and shows them to be in communication with exhaust duct means, for example, 17 via a pitot tube or other pressure sensing device 217 having associated high pressure line 215 and low pressure line 216. The exhaust manometer 211 shown in FIG. 3 comprises two upwardly-directed legs 210 and 212 which contain sufficient fluid 213 to at least partially fill each leg throughout the intended range of operating pressures. The legs may, as in the case of the legs of manometer for the heat input display, have cross-sectional areas which vary effectively to cause the level of fluid in the exhaust display leg 210 to move in direct proportion to the rate of flow of exhaust gas through the exhaust duct means 17.

Means are shown in FIG. 1 to position the exhaust display legs 210 through 270 for each zone of the oven in the same sequence that the associated exhaust duct means occupies within the oven. In the particular embodiment shown, the exhaust display legs are channels of uniform dimension within a transparent material and are aligned and positioned directly over a chart which is calibrated to indicate the rate of exhaust for each zone, and further marked to indicate the preferred exhaust profile for the plurality of zones in the oven. This enables the exhaust flow from each zone to be controlled by operating the damper means, 18 through 78, associated therewith to adjust the fluid level in the associated exhaust display leg to the preferred value for each zone. In the embodiment shown in FIG. 1, the exhaust profile is indicated by line 204.

It will be noted from FIG. 3 that the exhaust display legs 210 through 270 are not vertically upright but inclined upwardly such that a greater degree of responsiveness on the display is achieved for the minor variations in pressures encountered. The exhaust manometers have associated valve means 214 through 274 to permit venting of manometers of ambient pressure and adjustment of the zero point by means of well and set screw arrangements 219 through 279. Valve 214 in FIG. 3 has an operative position for venting wherein the high pressure line 215 and the low pressure line 216 from the pressure sensing device 217, which can be a simple pitot tube or other device known to the art, are removed from their normal communication with the manometer, and the manometer is purged via line 218.

The above description is for the purpose of teaching the person of ordinary skill in the art how to practice the present invention, and is not intended to describe in detail each and every obvious modification and variation thereof. It is intended, however, to include all such obvious modifications and variations within the scope of the present invention which is defined by the following claims.

I claim:

1. An apparatus for displaying the rate of heat input to a zone of an oven of the type comprising burner means, gas supply means comprising a supply conduit for transporting combustible gas between a pressurized source and the burner means, and valve means operable to vary the flow of combustible gas through the supply conduit, wherein the apparatus comprises:
    (a) a manometer in communication with the supply conduit, having two upwardly-directed legs and containing sufficient fluid to at least partially fill each leg throughout the intended operating range, wherein one of said legs is a display leg and the cross-sectional areas of both legs are proportioned effectively to cause the level of fluid in the display leg to move in direct proportion to the rate of flow of combustible gas to the burner means;
    (b) an adjustable scale juxtaposed with the display leg and linearly calibrated to indicate the rate of heat input to the zone of the oven for a given rate of flow of combustible gas indicated by the level of fluid in the display leg; and
    (c) means for adjusting said adjustable scale to correct for the heating value of the combustible gas, comprising a calibration scale having markings indicating a range of heating values for various combustible gases, a set point indicator, and means for aligning the set point indicator with a marking on the calibration scale corresponding to the heating value of the combustible gas in use.

2. An apparatus according to claim 1 which further comprises a vent valve associated with the manometer, the vent valve having an operative position to interrupt the communication with the supply conduit, and means for adjusting the level of fluid in the display leg while the vent valve is in the operative position.

3. An apparatus according to claim 1 wherein the display leg of the manometer comprises a channel of substantially uniform diameter in a transparent material.

4. An apparatus according to claim 1 wherein the leg other than the display leg comprises a tapered channel, the cross-sectional area of which increases proportionally to its height, the upper-most cross-section being the largest.

5. An apparatus according to claim 1 wherein the display leg of the manometer comprises a channel in a transparent material, and the adjustable scale is positioned directly behind the display leg.

6. An apparatus according to claim 5 wherein the display leg comprises a channel of substantially uniform diameter; and the other leg comprises a tapered channel, the cross-sectional area of which increases proportionally to height, the uppermost cross-section being the largest.

7. An apparatus according to claim 6 which further comprises a vent valve associated with the manometer, the vent valve having an operative position to interrupt the communication with the supply conduit, and means for adjusting the level of fluid in the display leg while the vent valve is in the operative position.

8. A control apparatus for controlling the heat input and distribution of heat within an oven having a plurality of zones, each zone comprising separate burner means; separate gas supply means comprising a supply conduit for transporting combustible gas between a pressurized source and the burner means; and separate valve means operable to vary the flow of combustible gas through the supply conduit, wherein the control apparatus comprises:
   (a) for each zone of the oven, a manometer in communication with the supply conduit, having two upwardly-directed legs and containing sufficient fluid to at least partially fill each leg throughout the intended operating range, wherein one of said legs is a display leg and the cross-sectional areas of both legs are proportioned effectively to cause the level of fluid in the display leg to move in direct proportion to the rate of flow of combustible gas to the burner means;
   (b) an adjustable scale juxtapositioned with the display legs of the display means for all of the zones of the oven, the scale being linearly calibrated to indicate the rate of heat input to the zones based on the flow of combustible gas indicated by the level of fluid in the display legs, the scale being further marked to indicate the preferred heat input profile for the plurality of zones of the oven, whereby the gas flow to each zone can be controlled by operating the valve means for each zone to adjust the fluid level in the associated display leg to the preferred head input indicated for each zone; and
   (c) means for adjusting said adjustable scale to correct for the heating value of the combustible gas.

9. A control apparatus according to claim 8 which further comprises vent valves associated with each manometer, the vent valves each having an operative position to interrupt the communication with the associated supply conduit, and means for adjusting the level of fluid in a display leg while the vent valve is in the operative position.

10. An apparatus according to claim 8 wherein the display leg of each manometer comprises a channel of substantially uniform diameter in a transparent material.

11. An apparatus according to claim 8 wherein the leg other than the display leg for each manometer comprises a tapered channel, the cross-sectional area of which increases proportionally to the height, the uppermost cross-section being the largest.

12. An apparatus according to claim 8 wherein the display leg of each manometer comprises a channel in a transparent material, the display legs for the manometers for each zone of the oven are aligned in the same sequence as the associated zones are aligned within the oven, and the adjustable scale is positioned directly behind the aligned display legs.

13. An apparatus according to claim 12 wherein the display leg of each manometer comprises a channel of substantially uniform diameter; and the other leg of each manometer comprises a tapered channel, the cross-sectional area of which increases proportionally to height, the upper-most cross-section being the largest.

14. An apparatus according to claim 13 which further comprises a vent valve associated with each manometer, each vent valve having an operable position to interrupt the communication with the supply conduit, and means for adjusting the level of fluid in the display leg of each manometer while the associated vent valve is in the operative position.

15. A control apparatus for controlling the heat input and distribution of heat within an oven having a plurality of zones, each zone comprising separate burner means; separate gas supply means comprising a supply conduit for transporting combustible gas between a pressurized source and the burner means; and separate valve means operable to vary the flow of combustible gas through the supply conduit, wherein the control apparatus comprises:
   (a) for each zone of the oven, a manometer in communication with the supply conduit, having two upwardly-directed legs and containing sufficient fluid to at least partially fill each leg throughout the intended operating range, wherein one of said legs is a display leg and the cross-sectional areas of both legs are proportioned effectively to cause the level of fluid in the display leg to move in direct proportion to the rate of flow of combustible gas to the burner means;
   (b) an adjustable scale juxtapositioned with the display legs of the display means for all of the zones of the oven, the scale being linearly calibrated to indicate the rate of heat input to the zones based on the flow of combustible gas indicated by the level of fluid in the display legs; and
   (c) means for adjusting the adjustable scale to correct for the heating value of the combustible gas, comprising a calibration scale having markings indicating a range of heating values for various combustible gases, a set point indicator, and means for aligning the set point indicator with a marking on the calibration scale corresponding to the heating value of the combustible gas in use.

16. A control apparatus for controlling the heat input and distribution of heat within an oven having a plurality of zones, each zone comprising separate burner means; separate gas supply means comprising a supply conduit for transporting combustible gas between a pressurized source and the burner means; and separate valve means operable to vary the flow of combustible gas through the supply conduit, wherein the control apparatus comprises:
  (a) for each zone of the oven, a manometer in communication with the supply conduit, having two upwardly-directed legs and containing sufficient fluid to at least partially fill each leg throughout the intended operating range, wherein one of said legs is a display leg and the cross-sectional areas of both legs are proportioned effectively to cause the level of fluid in the display leg to move in direct proportion to the rate of flow of combustible gas to the burner means;
  (b) an adjustable scale juxtapositioned with the display legs of the display means for all of the zones of the oven, the scale being linearly calibrated to indicate the rate of heat input to the zones based on the flow of combustible gas indicated by the level of fluid in the display legs;
  (c) means for adjusting said adjustable scale to correct for the heating value of the combustible gas; and
  (d) exhaust display means for displaying the rate of removal of exhaust gases from the individual zones of the oven, each zone comprising separate exhaust duct means and damper means operable to vary the flow of exhaust gases through the exhaust duct means, the display means comprising
    (i) for each zone of the oven, an exhaust manometer in communication with the exhaust duct means, the exhaust manometer comprising two upwardly-directed legs and containing sufficient fluid to at least partially fill each leg throughout the intended operating range, wherein one of said legs is an exhaust display leg wherein the level of fluid moves in response to the rate of flow of exhaust gas through the exhaust duct means;
    (ii) means for positioning the exhaust display legs for each zone of the oven in the same sequence that the associated exhaust duct means occupy within the oven; and
    (iii) a chart juxtaposed with the exhaust display legs, the chart being calibrated to indicate the rate of exhaust for each zone and marked to indicate the preferred exhaust profile for the plurality of zones of the oven, whereby the exhaust flow from each zone can be controlled by operating the damper means associated therewith to adjust the fluid level in the associated exhaust display leg to the preferred value for each zone.

17. An apparatus according to claim 16 wherein the exhaust display legs of the individual exhaust manometers comprise inclined channels of substantially uniform cross-section.

18. An apparatus according to claim 16 which further comprises a vent valve associated with the exhaust manometer, the vent valve having an operable position to interrupt the communication with the exhaust duct means, and means for adjusting the level of fluid in the display leg while the vent valve is in the operative position.

* * * * *